(12) United States Patent
Stachowiak

(10) Patent No.: US 7,147,924 B2
(45) Date of Patent: Dec. 12, 2006

(54) COATED ARTICLE WITH DUAL-LAYER PROTECTIVE OVERCOAT OF NITRIDE AND ZIRCONIUM OR CHROMIUM OXIDE

(75) Inventor: Grzegorz Stachowiak, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 298 days.

(21) Appl. No.: 10/406,003

(22) Filed: Apr. 3, 2003

(65) Prior Publication Data
US 2004/0197574 A1 Oct. 7, 2004

(51) Int. Cl.
*B32B 9/00* (2006.01)

(52) U.S. Cl. ............ 428/428; 428/432; 428/433; 428/446; 428/448; 428/697; 428/698; 428/699; 428/701; 428/702; 428/704

(58) Field of Classification Search ............ 428/428, 428/432, 433, 446, 448, 697, 698, 699, 701, 428/702, 704
See application file for complete search history.

(56) References Cited

U.S. PATENT DOCUMENTS

| | | | |
|---|---|---|---|
| 4,071,649 A | 1/1978 | Jacquemin et al. | |
| 4,462,883 A | 7/1984 | Hart | |
| 4,894,290 A | 1/1990 | Chesworth et al. | |
| 5,059,295 A | 10/1991 | Finley | |
| 5,201,926 A | 4/1993 | Szczyrbowski et al. | |
| 5,229,194 A | 7/1993 | Lingle et al. | |
| 5,318,685 A | 6/1994 | O'Shaughnessy | |
| 5,387,433 A | 2/1995 | Balian et al. | |
| 5,395,698 A | 3/1995 | Neuman et al. | |
| 5,411,794 A * | 5/1995 | Kawaguchi et al. | 428/216 |
| 5,514,476 A | 5/1996 | Hartig et al. | |
| 5,557,462 A | 9/1996 | Hartig et al. | |
| 5,837,108 A | 11/1998 | Lingle et al. | |
| 6,132,881 A * | 10/2000 | Hartig et al. | 428/432 |
| 6,352,755 B1 | 3/2002 | Finley et al. | |
| 6,475,626 B1 | 11/2002 | Stachowiak | |
| 6,495,263 B1 | 12/2002 | Stachowiak | |
| 6,514,620 B1 | 2/2003 | Lingle et al. | |
| 6,524,714 B1 | 2/2003 | Neuman et al. | |
| 2002/0009601 A1* | 1/2002 | Stachowiak | 428/432 |
| 2002/0021495 A1* | 2/2002 | Lingle | 359/585 |
| 2002/0064662 A1* | 5/2002 | Lingle et al. | 428/432 |

* cited by examiner

Primary Examiner—Deborah Jones
Assistant Examiner—G. Blackwell
(74) Attorney, Agent, or Firm—Nixon & Vanderhye P.C.

(57) ABSTRACT

A coated article is provided so as to include an overcoat including zirconium oxide or chromium oxide. In certain example embodiments, the overcoat includes a dual layer overcoat including a nitride inclusive layer which supports a zirconium oxide ($ZrO_x$) layer. In certain example embodiments, the overcoat may be of chromium oxide, with or without such a nitride inclusive layer.

31 Claims, 3 Drawing Sheets
(1 of 3 Drawing Sheet(s) Filed in Color)

COATED ARTICLE WITH DUAL-LAYER PROTECTIVE OVERCOAT OF NITRIDE AND ZIRCONIUM OR CHROMIUM OXIDE

This invention relates to coated articles that include a protective overcoat including a nitride inclusive layer which supports a layer comprising zirconium oxide or chromium oxide. Surprisingly, in the case of the nitride inclusive layer supporting zirconium oxide, it has been found that the provision of such a dual-layer overcoat allows for significantly improved mechanical and/or chemical durability while at the same time permitting heat treatability and good optical characteristics. Chromium oxide may be used instead of zirconium oxide in certain embodiments of this invention, but not in heat treatable embodiments. Moreover, in chromium oxide embodiments, the nitride inclusive layer need not be provided in all instances.

BACKGROUND AND SUMMARY OF THE INVENTION

Solar control coatings having a layer stack of glass/$Si_3N_4$/NiCr/$Si_3N_4$ are known in the art, where the metallic NiCr layer is the sole infrared (IR) reflecting layer in the coating. For example, see U.S. Pat. No. 5,837,108 to Lingle. In certain instances, the NiCr layer may be nitrided.

Unfortunately, while such layer stacks glass/$Si_3N_4$/NiCr/$Si_3N_4$ provide efficient solar control and are overall good coatings, they sometimes are lacking in terms of: (a) corrosion resistance to alkaline solutions (e.g., NaOH boil test), particularly at elevated temperatures, (b) resistance to high humidity, and/or (c) mechanical performance such as scratch resistance. Such problems are particularly troublesome in environments such as construction sites, wherein high humidity and alkaline solutions such as concrete products are fairly common. For example, it has been observed that concrete splashes often cause discoloration of coated articles having the aforesaid stack of glass/$Si_3N_4$/NiCr/$Si_3N_4$, due to the alkali in the concrete material. Moreover, while the silicon nitride overcoat of such coated articles is very hard, it has been found to have a tendency to scratch due to high surface friction and roughness, and such scratches can open other layer(s) to chemical attacks (i.e., corrosion). Thus, it can be seen that even though silicon nitride provides for good optical characteristics, and is very hard, it has chemical and/or mechanical durability issues when used as an overcoat.

For example, the right-hand sample shown in color FIG. 5 illustrates what a coated article of glass/$Si_3N_4$/NiCr/$Si_3N_4$ looks like after the bottom half thereof has been subjected to a one hour NaOH boil test (one hour boil in solution including about 0.1 normal NaOH solution—0.4% NaOH mixed with water—at about 195 degrees F.). For the boil test, see ASTM D 1308-87, incorporated herein by reference. Clearly, it can be seen that the portion of the right-hand sample which was dipped in the NaOH solution during the boil test (i.e., the bottom half of the sample) was significantly discolored due to the alkaline boil test compared to the upper half of the sample which was not dipped in the solution during the boil test. In other words, the right-hand sample in FIG. 5, i.e., glass/$Si_3N_4$/NiCr/$Si_3N_4$, failed the alkaline boil test.

Common overcoats such as titanium oxide and tin oxide are even less durable than silicon nitride.

Accordingly, there exists a need in the art for a coated article that has improved (a) corrosion resistance to alkaline solutions (e.g., NaOH boil), (b) resistance to high humidity, and/or (c) mechanical performance such as scratch resistance, but which still is capable of acceptable solar control (e.g., blocking a reasonable amount of IR and/or UV radiation) and/or heat treatability with a fairly low $\Delta E^*$ value (glass side reflective and/or transmissive). It is a purpose of this invention to fulfill at least one of the above-listed needs (a)–(c), and/or other need(s) which will become apparent to the skilled artisan once given the following disclosure.

U.S. Pat. No. 5,201,926 discloses a coated article of: glass/ZrO/NiCr/Ag/NiCr/ZrO. Unfortunately, even though the coated article of the '926 patent is problematic in that it likely would not survive heat treatment (HT) in a commercially acceptable manner given this particular layer stack. This is because, if subjected to heat treatment, oxygen from the zirconium oxide layers would diffuse into the NiCr and Ag layers during HT thereby damaging the same and giving rise to a fairly high $\Delta E^*$ value of 8 or higher. This layer stack would not survive heat treatment in a commercially acceptable manner with such a high $\Delta E^*$ value. Moreover, HT may well cause such a coating to lose durability after HT, and possible haze and/or film peeling may occur due to at least partial oxidation of the silver which would likely occur during such HT.

In certain example embodiments of this invention, a coating or layer system is provided which includes a dual-layer overcoat including a layer comprising a nitride which supports a layer comprising zirconium oxide ($ZrO_X$). This dual layer overcoat is provided over a plurality of underlying layers which include an infrared (IR) reflecting layer (e.g., Ag, NiCr, Cr, CrN, Nb, NbCr, $NbN_X$, $NbCrN_X$, Au, or the like) sandwiched between at least first and second other layers. In the dual layer overcoat of nitride/$ZrO_X$, the zirconium oxide provides mechanical and chemical durability (e.g., scratch resistance and resistance to corrosion from alkaline solutions and the like), and the underlying nitride inclusive layer (e.g., silicon nitride) provides heat treatability by preventing significant amounts of oxygen from diffusing from the zirconium oxide into the IR reflecting layer during heat treatment (HT). Thus, the nitride inclusive layer may, in certain example embodiments, allow the coated article of have a $\Delta E^*$ value (glass side reflective and/or transmissive) of no greater than 6.0, more preferably no greater than 5.0, even more preferably no greater than 4.0, still more preferably no greater than 3.0, and in certain example instances no greater than 2.0 due to HT.

Thus, it has surprisingly been found that the combination of nitride/$ZrO_X$ in a dual layer overcoat allows for a coated article which is chemically and mechanically durable, has acceptable optical properties such as transmittance and/or reflectance, and which is heat treatable in a commercially acceptable manner. It has also been surprisingly found that the combination of nitride/$ZrO_X$ in a dual layer overcoat significantly improves a coated article's resistance to damage by high humidity environments, thereby improving storage life.

In other example embodiments of this invention, the zirconium oxide overcoat layer may be replaced with, or supplemented with, a layer comprising chromium oxide ($CrO_X$). In embodiments which utilize a chromium oxide overcoat layer, the nitride layer is optional and may or may not be provided. The chromium oxide is used in certain embodiments where heat treatability is not desired (this is because chromium oxide as an overcoat tends to delaminate from silicon nitride due to HT). It has surprisingly been found that an overcoat comprising chromium oxide provides mechanical and chemical durability (e.g., scratch resistance and resistance to corrosion from alkaline solutions and the like).

Certain example embodiments of this invention provide a coated article including a layer system supported by a glass substrate, the layer system comprising: a first dielectric layer supported by the glass substrate; an infrared (IR) reflecting layer supported by the glass substrate and provided over at least the first dielectric layer; and a multi-layer overcoat provided over at least the IR reflecting layer, wherein the overcoat includes a first layer comprising silicon nitride having an index of refraction "n" of from 1.7 to 2.5 and a second layer comprising zirconium oxide located over the first layer comprising silicon nitride. Optionally, other layer(s) may be provided between the first layer comprising silicon nitride and the second layer comprising zirconium oxide.

Other example embodiments of this invention provide a coated article including a layer system supported by a glass substrate, comprising: a first dielectric layer supported by the glass substrate; an infrared (IR) reflecting layer supported by the glass substrate and provided over at least the first dielectric layer; an overcoat provided over at least the IR reflecting layer and the first dielectric layer, wherein the overcoat includes one of: (a) a first layer comprising silicon nitride which supports and directly contacts a second layer comprising zirconium oxide located over and contacting the first layer comprising silicon nitride; and (b) a chromium oxide layer; and wherein the coated article has a visible transmission of from 8 to 80%, and a sheet resistance ($R_S$) of less than 120 ohms/square. Optionally, other layer(s) may be provided between the first layer comprising silicon nitride and the second layer comprising chromium oxide.

IN THE DRAWINGS

The patent or application file contains at least one drawing executed in color (see FIG. 5). Copies of this patent or patent application publication with color drawing(s) will be provided by the Office upon request and payment of the necessary fee.

DETAILED DESCRIPTION OF CERTAIN EXAMPLE EMBODIMENTS OF THE INVENTION

Certain example embodiments of this invention provide a coating or layer system that may be used in windows such as monolithic windows (e.g., vehicle, residential, and/or architectural windows), IG window units, laminated windows, and/or other suitable applications. In certain example embodiments of this invention, a coating or layer system is provided which includes a dual-layer overcoat including a layer comprising a nitride which supports a layer comprising zirconium oxide ($ZrO_X$). This dual layer overcoat is provided over a plurality of underlying layers which include at least one infrared (IR) reflecting layer. Optionally, other layer(s) may be provided between the layer comprising a nitride and the layer comprising zirconium oxide.

In the dual layer overcoat of nitride/$ZrO_X$, the zirconium oxide provides mechanical and chemical durability (e.g., improved scratch resistance and improved resistance to corrosion from alkaline solutions and the like), and the underlying nitride inclusive layer (e.g., silicon nitride) provides both durability, and heat treatability by preventing significant amounts of oxygen from diffusing from the zirconium oxide into the IR reflecting layer during heat treatment (HT).

It has surprisingly been found that the combination of nitride/$ZrO_X$ in a dual layer overcoat allows for a coated article which is chemically and mechanically durable, has acceptable optical properties such as transmittance and/or reflectance, and which is heat treatable in a commercially acceptable manner (i.e., with reasonable $\Delta E^*$ values). It has also been surprisingly found that the combination of nitride/$ZrO_X$ in a dual layer overcoat significantly improves a coated article's resistance to damage by high humidity environments, thereby improving storage life. In other example embodiments of this invention, the zirconium oxide may be replaced by chromium oxide, and the nitride thereunder is optional.

Figure 1:
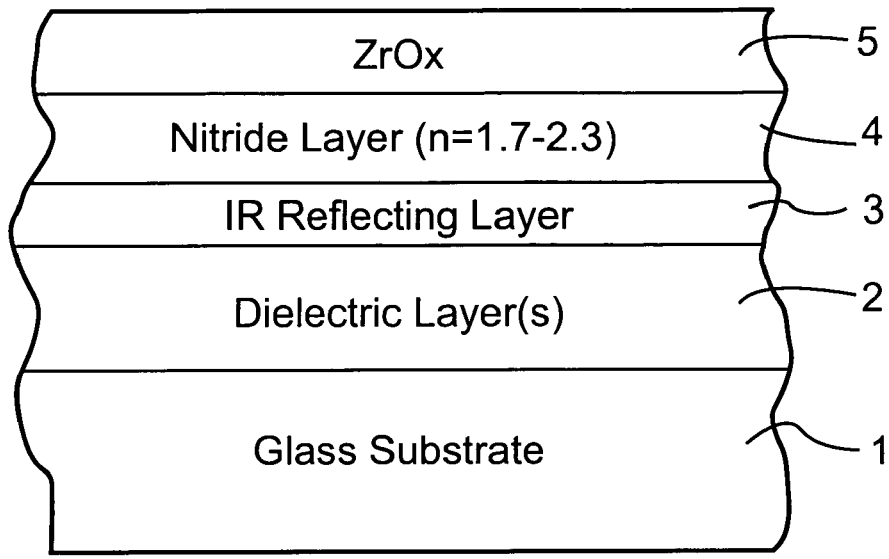
FIG. 1 is a partial cross sectional view of a monolithic coated article (heat treated or not heat treated) according to an example embodiment of this invention, which utilizes a dual layer overcoat of nitride/$ZrO_X$.

FIG. 1 is a side cross sectional view of a coated article according to an example embodiment of this invention. The coated article includes at least substrate 1 (e.g., clear, green, bronze, grey, blue, or blue-green glass substrate from about 1.0 to 12.0 mm thick), first optional dielectric layer 2 (e.g., of or including silicon nitride (e.g., $Si_3N_4$), tin oxide, or some other suitable dielectric), and infrared (IR) reflecting layer 3 (e.g., consisting essentially of or including NiCr, $CrN_X$, niobium chromium (NbCr), a nitride of niobium chromium (NbCr$N_X$), Ni, or the like).

The coated article of FIG. 1 further includes a dual layer overcoat comprising nitride inclusive layer 4 which supports zirconium oxide inclusive layer 5. Nitride inclusive layer 4 is typically a dielectric layer and may consist essentially of or comprise silicon nitride in certain example embodiments of this invention. The silicon nitride layer 4 may include stainless steel, aluminum and/or other metals in certain example embodiments of this invention (e.g., <=15%, more preferably <=10% of stainless steel, aluminum and/or other metals). Layer 5 may consist essentially of, or comprise, zirconium oxide in certain embodiments of this invention. As explained above, in the dual layer overcoat of nitride 4 and $ZrO_X$ 5, the zirconium oxide 5 provides improved mechanical and chemical durability, and the underlying nitride inclusive layer (e.g., silicon nitride) 4 provides both durability, and heat treatability by preventing significant amounts of oxygen from diffusing into the IR reflecting layer during heat treatment (HT). Thus, the nitride layer 4 may, in certain example embodiments, allow the coated article to have a ΔE* value (glass side reflective and/or transmissive) of no greater than 6.0, more preferably no greater than 5.0, even more preferably no greater than 4.0, still more preferably no greater than 3.0, and in certain example instances no greater than 2.0 due to HT.

The overall coating of FIG. 1 includes at least layers 2–5. It is noted that the terms "oxide" and "nitride" as used herein include various stoichiometries. Layers 2–5 may be deposited on substrate 1 via magnetron sputtering, any other type of sputtering, or via any other suitable technique in different embodiments of this invention. Other layer(s) may be provided between illustrated layers in certain other non-illustrated embodiments of this invention. Moreover, certain layers may be deleted in other embodiments of this invention. Furthermore, while the coating or layers thereof is/are "on" or "supported by" substrate 1 (directly or indirectly), other layer(s) may be provided therebetween. Thus, for example, the layer system and layers thereof shown in FIG. 1 are considered "on" the substrate 1 even when other layer(s) (not shown) are provided therebetween (i.e., the terms "on" and "supported by" as used herein are not limited to directly contacting). Also, more than one IR reflecting layer may be provided in certain example embodiments of this invention.

Figure 5:
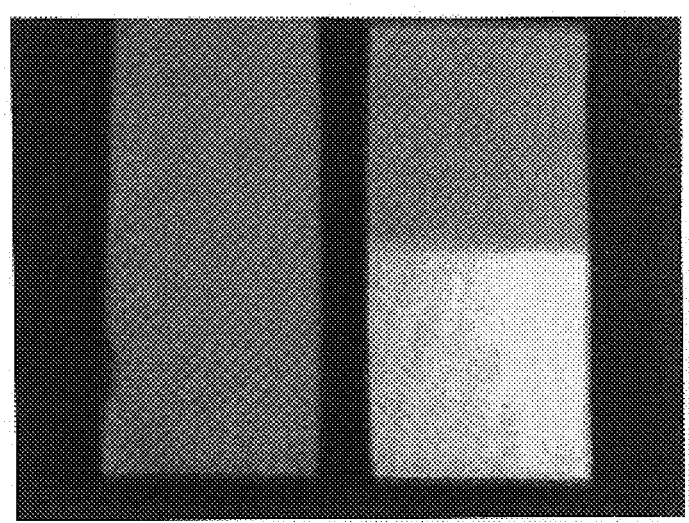
FIG. 5 is a color photograph comparing the following two coated articles: (i) glass/$Si_3N_4$/CrN/$Si_3N_4$/$ZrO_X$ (left-hand sample with dual layer overcoat nitride/$ZrO_X$, according to an example embodiment of this invention), and (ii) glass/$Si_3N_4$ CrN/$Si_3N_4$ (right-hand sample), after the bottom halves of the two monolithic coated articles were subjected to a one hour NaOH boil test.

FIG. 5 illustrates photographs of a pair of as-coated (non-HT, even though annealed before coating in a known manner) coated articles for purposes of comparison. The left-hand sample shown in FIG. 5 was made up of the following layer stack: glass/$Si_3N_4$/CrN/$Si_3N_4$/$ZrO_X$, thereby including the dual layer overcoat 4, 5 according to the FIG. 1 embodiment of this invention. For purposes of comparison, the right-hand sample shown in FIG. 5 was made up of the following layer stack: glass/$Si_3N_4$/CrN/$Si_3N_4$ (i.e., without the nitride/$ZrO_X$ overcoat). The bottom half of each sample in FIG. 5 was dipped in an NaOH solution for one hour (one hour boil in solution including about 0.1 normal NaOH solution—0.4% NaOH mixed with water—at about 195 degrees F.).

It can be seen in FIG. 5 that the comparative sample (right-hand sample with no zirconium oxide layer 5) was significantly damaged by the boil test. However, FIG. 5 makes clear that the left-hand sample with the dual layer overcoat 4, 5 according to the FIG. 1 embodiment of this invention was not significantly damaged by the boil test. The bottom half of each sample was subjected to the one hour NaOH boil test described above, while the top half of each sample was not. In particular, the a*, b* and L* color values of the left-hand sample in FIG. 5 according to an example of this invention did not significantly change due to the boil test (e.g., none of these values a* and b* changed by more than 2.0 due to the boil test). In contrast, the a*, b* and L* values of the right-hand sample with no layer 5 all significantly changed due to the boil test as will be recognized by those skilled in the art reviewing FIG. 5. The damage done to the right-hand sample, and thus the advantages of the left-hand sample according to an embodiment of this invention, are clear. In particular, FIG. 5 illustrates that resistance to alkaline solutions (e.g., NaOH) improves dramatically when the dual layer overcoat of nitride/$ZrO_X$ is provided, compared to a situation where only a nitride overcoat is provided. It is noted that the extreme yellow-orange coloration shown in color FIG. 5 is a result of the camera used in taking the photos and the amplification done of the digital photos, and is not reflective of true appearances in normal environmental conditions.

The left-hand sample in FIG. 5 also experienced a significant improvement with respect to scratch resistance, compared to the right-hand sample in FIG. 5. In particular, before HT, the left-hand sample could not be significantly scratched with a Teledyne Scratch Tester (load 500 gm). While the left-hand sample could be scratched after HT, although the scratches were very minimal and were hard to visibly notice in reflection and could not be seen in transmission. In contrast, the right-hand sample in FIG. 5 scratch to a greater extent, and such scratches are typically visible in reflection.

Furthermore, it is noted that the left-hand sample in FIG. 5 was much more resistant to corrosion from concrete than was the right-hand sample; e.g., tested by dropping wet concrete on the coating and maintaining it wet for several days wrapped with a wet tissue and foil). Scratching is much more likely when removing concrete spots from silicon nitride, because the concrete fuses to the nitride and is much more difficult to remove than from zirconium oxide. Although not shown in FIG. 5, the left-hand sample when subjected to such a concrete test did not suffer any visible damage (e.g., discoloration), whereas the right-hand sample experienced clear discoloration.

In certain example embodiments of this invention, the aforesaid NaOH boil test (for ten minutes and/or one hour) causes visible transmission ($T_{vis}$) of coated articles according to certain example embodiments of this invention (before and/or after HT) to change by no more than 4%, more preferably by no more than 2%, even more preferably by no more than 1%; and causes film side visible reflectance (Rf) to change by no more than 8%, more preferably by no more than 5%, and most preferably by no more than 3%. For example, and without limitation, if $T_{vis}$ was 20.0% before the boil test, a 0.5% drop in visible transmission due to the boil test would result in a $T_{vis}$ of 19.9%. In contrast, and for purposes of comparison, for the right-hand sample of FIG. 5 (not in accordance with this invention), the aforesaid NaOH boil test (for about ten minutes) caused visible transmission ($T_{vis}$) of the coated article to drop by about 8%, and caused the film side visible reflectance (Rf) to increase by well more than 10%. The advantages according to certain example embodiments of this invention are clear with respect to chemical durability.

In certain example embodiments of this invention, dielectric nitride inclusive layer 4 has an index of refraction "n" of from 1.7 to 2.5, more preferably from 1.8 to 2.2, even more preferably from 1.9 to 2.2. It has been found that this index of refraction "n" range for nitride layer 4, when used in combination with zirconium oxide layer 5, provides for good anti-reflection functionality thereby allowing for high visible transmission to be achieved. If layer 4 were to have an index "n" less than 1.7, this would be undesirable because the index would be severely mismatched with respect to layer 5 thereby causing significant reflection and thus lower visible transmission. It is noted that the zirconium oxide inclusive layer(s) discussed herein may have an index of refraction "n" of from about 2.0 to 2.2 in certain example embodiments of this invention.

In certain example embodiments of this invention, the overcoat may include a series of alternating thin layers 4/5 comprising nitride (e.g., silicon nitride)/ZrO (e.g., superlattices). For example, in one example alternative embodiment of this invention, the overcoat may comprise the following layers going away from the glass substrate: nitride/$ZrO_X$/nitride/$ZrO_X$/nitride/$ZrO_X$ (where the nitride may be of or include silicon nitride, or any other suitable nitride).

While FIG. 1 illustrates a coated article according to an embodiment of this invention in monolithic form, coated articles according to other embodiments of this invention may comprise IG (insulating glass) window units. In IG embodiments, coatings from FIG. 1 may be provided on the inner wall of the outer substrate of the IG unit, and/or on the inner wall of the inner substrate, or in any other suitable location.

Turning back to FIG. 1, various thicknesses may be used consistent with one or more of the needs discussed herein. However, for purposes of example only, example thicknesses and materials for the respective layers 2–5 on the glass substrate 1 are as follows:

TABLE 1

(Example non-limiting thicknesses; FIG. 1 embodiment)

| Layer | Example Range (Å) | Preferred (Å) | Best (Å) |
|---|---|---|---|
| silicon nitride (layer 2): | 0–1,500 Å | 20–1300 Å | 100–1200 Å |
| IR Reflector (layer 3): | 30–700 Å | 50–500 Å | 150–350 Å |
| silicon nitride (layer 4): | 10–900 Å | 30–800 Å | 50–350 Å |
| zirconium oxide (layer 5): | 5–250 Å | 5–90 Å | 5–80 Å |

In certain exemplary embodiments, the color stability with HT may result in substantial matchability between heat-treated and non-heat treated versions of the coating or layer system. In other words, in monolithic and/or IG applications, in certain embodiments of this invention two coated articles having the same coating system thereon (one HT after deposition and the other not HT) appear to the naked human eye to look substantially the same. This is believed to be primarily a result of the presence of nitride layer 4.

The value(s) ΔE* is important in determining whether or not there is matchability, or substantial color matchability upon HT, in the context of certain embodiments of this invention (i.e., the term ΔE* is important in determining color stability upon HT). Color herein is described by reference to the conventional a*, b* values. For example, the term Δa* is indicative of how much color value a* changes due to HT. The term ΔE* (and ΔE) is well understood in the art. The definition of the term ΔE* may be found, for example, in WO 02/090281 and/or U.S. Pat. No. 6,475,626, the disclosures of which are hereby incorporated herein by reference. In particular, ΔE* corresponds to the CIE LAB Scale L*, a*, b*, and is represented by:

$$\Delta E^* = \{(\Delta L^*)^2 + (\Delta a^*)^2 + (\Delta b^*)^2\}^{1/2} \quad (1)$$

where:

$$\Delta L^* = L^*_1 - L^*_o \quad (2)$$

$$\Delta a^* = a^*_1 - a^*_o \quad (3)$$

$$\Delta b^* = b^*_1 - b^*_o \quad (4)$$

where the subscript "o" represents the coating (or coated article) before heat treatment and the subscript "1" represents the coating (or coated article) after heat treatment; and the numbers employed (e.g., a*, b*, L*) are those calculated by the aforesaid (CIE LAB 1976) L*, a*, b* coordinate technique. In a similar manner, ΔE may be calculated using equation (1) by replacing a*, b*, L* with Hunter Lab values $a_h$, $b_h$, $L_h$. Also within the scope of this invention and the quantification of ΔE* are the equivalent numbers if converted to those calculated by any other technique employing the same concept of ΔE* as defined above.

Before heat treatment (HT) such as heat strengthening and/or thermal tempering, in certain example embodiments of this invention coated articles have color characteristics as follows in Table 2 (monolithic and/or IG unit). It is noted that subscript "G" stands for glass side reflective color, subscript "T" stands for transmissive color, and subscript "F" stands for film side color. As is known in the art, glass side (G) means reflective color when viewed from the glass side (as opposed to the layer/film side) of the coated article. Film side (F) means reflective color when viewed from the side of the coated article on which the coating is provided. Table 3 set forth below illustrates certain characteristics of coated articles according to certain example embodiments of this invention after HT (monolithic and/or IG units)—the characteristics below in Table 2 (non-HT) are also applicable to HT coated articles herein, except for the additions set forth in Table 3.

TABLE 2

Color/Optical Characteristics (non-HT)

| | General | Preferred | Most Preferred |
|---|---|---|---|
| $T_{vis}$ (TY): | 8–80% | 10–50% | 12–30% |
| $L^*_T$ | 34–92 | 37–76 | 41–62 |
| $a^*_T$ | −6 to +6 | −4 to +3 | −3 to +2 |
| $b^*_T$ | −20 to +20 | −15 to +10 | −10 to +10 |
| $R_G Y$ (glass side): | 8–50% | 10–40% | 12–30% |
| $L^*_G$ | 34–76 | 37–70 | 41–62 |
| $a^*_G$ | −6 to +6 | −4 to +3 | −3 to +2 |
| $b^*_G$ | −30 to +20 | −25 to +10 | −20 to +10 |
| $R_F Y$ (film side): | 8–50% | 8–40% | 12–37% |
| $L^*_F$ | 34–76 | 37–70 | 41–68 |
| $a^*_F$ | −9 to +9 | −6 to +6 | −5 to +5 |
| $b^*_F$ | −40 to +40 | −30 to +30 | −20 to +30 |
| $T_{sol}$ (TS %): | 5–50% | 5–30% | 9–22% |
| SC: | <=0.5 | <=0.45 | <=0.40 |
| SHGC: | <=0.45 | <=0.43 | <=0.35 |
| $T_{UV}$: | <=40% | <=35% | <=25% |
| $R_s$ (Ω/sq): | <250 | <120 | <100 |

TABLE 3

Color/Optical Characteristics (after HT; in addition to Table 2)

| | General | Preferred | Most Preferred |
|---|---|---|---|
| $\Delta E^*_G$ | <=6.0 | <=5.0 | <=4.0, 3.0 and/or 2.0 |
| $\Delta E^*_T$ | <=6.0 | <=5.0 | <=4.0, 3.0 and/or 2.0 |
| $\Delta a^*_G$ | <=2.0 | <=1.0 | <=0.8 |
| $\Delta b^*_G$ | <=3.0 | <=2.0 | <=1.0 |
| $\Delta L^*_G$ | <=10 | <=7 | <=5 |

Coated articles herein may even have a glass side reflective ΔE* value ($\Delta E^*_G$) of no greater than 1.8, or even no greater than 1.5, in certain example embodiments of this invention.

For purposes of example only, a plurality of examples representing different examples of the FIG. 1 embodiment are set forth below.

EXAMPLES

Examples 1–2 were monolithic coated articles (each ultimately annealed and heat treated, although not all embodiments herein need be HT), with the layer stack as shown in FIG. 1. The $Si_3N_4$ layers 2 and 4 in each example were deposited by sputtering a silicon target (doped with about 10% Al) in an atmosphere including nitrogen gas. The CrN$_X$ IR reflecting layer 3 in each example was deposited by sputtering a Cr target in an atmosphere including argon and nitrogen gas. The glass substrate 1 in each of the examples was clear and about 6 mm thick.

For Example 1, the following sputtering process parameters were used in depositing the coating. Line speed is in inches per minute (IPM), and gas (argon (Ar), nitrogen (N) and oxygen (O)) flows were in units of sccm. The zirconium oxide layer was deposited by an AC sputtering process.

TABLE 4

Example 1 Coating Process Parameters

| Layer | Power | Voltage | Line Speed | # Passes | Ar | N | O |
|---|---|---|---|---|---|---|---|
| SiN layer 2: | 2.5 kW | 516 V | 47.3 | 8 | 40 | 55 | 0 |
| CrN$_x$ layer 3: | 1.0 kW | 389 V | 34 | 2 | 45 | 15 | 0 |
| SiN layer 4: | 2.5 kW | 515 V | 53.5 | 2 | 40 | 55 | 0 |
| ZrO$_x$ layer 5: | 1.0 kW | 385 V | 30 | 1 | 30 | 0 | 12 |

For Example 2, the following sputtering process parameters were used in depositing the coating. Again, line speed is in inches per minute (IPM), and gas flows (Ar, N and O) were in units of sccm:

TABLE 5

Example 2 Coating Process Parameters

| Layer | Power | Voltage | Line Speed | # Passes | Ar | N | O |
|---|---|---|---|---|---|---|---|
| SiN layer 2: | 2.5 kW | 509 V | 41.2 | 2 | 40 | 55 | 0 |
| CrN$_x$ layer 3: | 1.0 kW | 389 V | 37.2 | 2 | 30 | 15 | 0 |
| SiN layer 4: | 2.5 kW | 515 V | 30.9 | 1 | 40 | 55 | 0 |
| ZrO$_x$ layer 5: | 1.0 kW | 351 V | 28.8 | 4 | 30 | 0 | 12 |

After being sputtered, Examples 1–2 had the following characteristics after being sputtered (annealed and non-HT, monolithic) (Ill. C, 2 degree observer):

TABLE 6

Characteristics (non- HT)

| Parameter | Ex. 1 | Ex. 2 |
|---|---|---|
| T$_{vis}$ (TY)(transmissive): | 20.0% | 23.0% |
| a*$_T$ | −1.1 | −0.8 |
| b*$_T$ | 2.8 | −6.3 |
| L*$_T$ | 52.0 | 55.0 |
| R$_G$Y(glass side refl. %): | 19.0% | 25.7% |
| a*$_G$: | −1.5 | −2.2 |
| b*$_G$: | −18.2 | 0.3 |
| L*$_G$: | 50.5 | 57.7 |
| R$_F$Y (film side refl. %): | 37.0% | 23.0% |
| a*$_F$: | 0.1 | −0.2 |
| b*$_F$: | 15.4 | 21.0 |
| L*$_F$: | 67.3 | 55.0 |
| T$_{sol}$ (TS) (%): | 15.0 | 18.0 |
| Shading Coefficient (SC): | 0.38 | 0.39 |
| SHGC: | 0.33 | 0.33 |
| T$_{uv}$ (UV transmission) (%): | 12 | 20 |
| Emissivity (h): | 0.46 | 0.51 |
| R$_s$ (sheet resistance; ohms/sq.): | 76 | 89 |

Each of Examples 1–2 had a layer stack as follows, set forth in Table 7. The thicknesses and stoichiometries listed below in Table 7 for the Examples 1–2 are approximations and are not exact. The coating for each example is shown in FIG. 1, and thus includes layers 2, 3 and 4. As explained above, the glass substrates were clear and about 6 mm thick in each Example.

TABLE 7

Coatings in Examples

| Example 1: | Glass/Si$_3$N$_4$(835 Å)/CrN$_x$(196 Å)/Si$_3$N$_4$(185 Å)/ZrO$_x$(36 Å) |
|---|---|
| Example 2: | Glass/Si$_3$N$_4$(240 Å)/CrN$_x$(180 Å)/Si$_3$N$_4$(160 Å)/ZrO$_x$(150 Å) |

After being sputter coated, the coated articles of Examples 1–2 were heat treated in an oven for 10 minutes at about 625 degrees C. Table 8 below sets forth color stability characteristics of Examples 1–2 upon/after heat treatment (HT).

TABLE 8

Glass Side Reflective Color Stability Upon HT

| Parameter | Example 1 | Example 2 |
|---|---|---|
| ΔE*$_G$: | 2.4 | 1.3 |

As can be seen from Table 8, each of Examples 1–2 was characterized by an excellent glass side reflective ΔE* value (the lower the better). This low value illustrates how little the glass side reflective optical characteristics of the coating changed upon the heat treatment. This is indicative of superior stability upon heat treatment.

Figure 2:
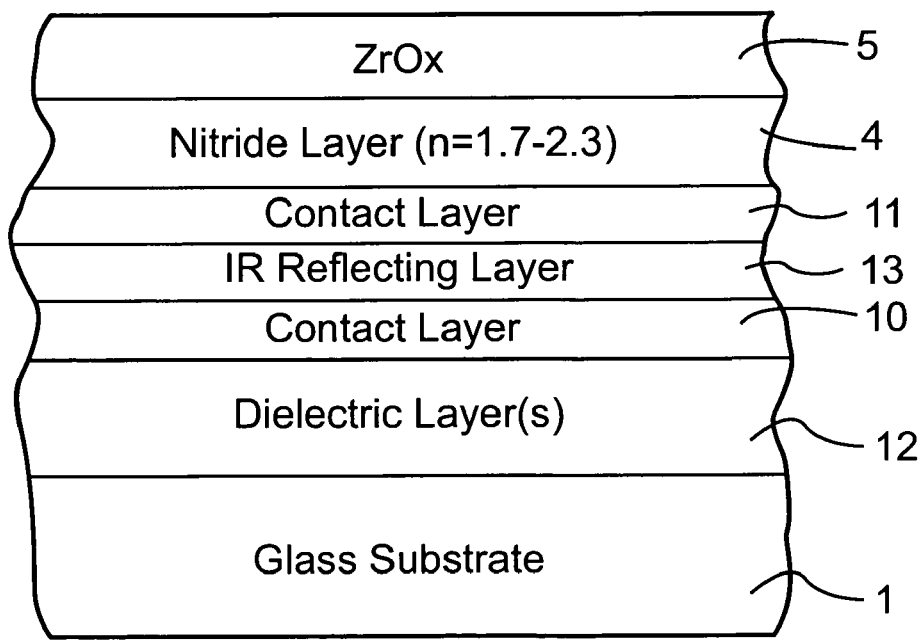
FIG. 2 is a partial cross sectional view of a monolithic coated article (heat treated or not heat treated) according to another example embodiment of this invention, which utilizes a dual layer overcoat of nitride/$ZrO_X$.

FIG. 2 illustrates a coated article according to another example embodiment of this invention. The dual layer overcoat 4, 5 in the FIG. 2 embodiment is the same as that of the FIG. 1 embodiment described above, and dielectric layer 12 in the FIG. 2 embodiment is similar to dielectric layer 2 in the FIG. 1 embodiment. However, the FIG. 2 embodiment differs from the FIG. 1 embodiment in that a pair of contact or nucleation layers are provided around and contacting the IR reflecting layer (i.e., lower contact/nucleation layer 10 and upper contact/nucleation layer 11). The IR reflecting layer 13 (e.g., comprised of Ag) is provided between and contacting layers 10 and 11. The contact layers 10 and/or 11 may be of, or include, NiCr, an oxide of NiCr, Ni, a nitride of NiCr, or any other suitable material in different embodiments of this invention. The dual layer overcoat 4, 5 in the FIG. 2 embodiment is advantageous for the same reasons discussed above with respect to the FIG. 1 embodiment.

Figure 3:
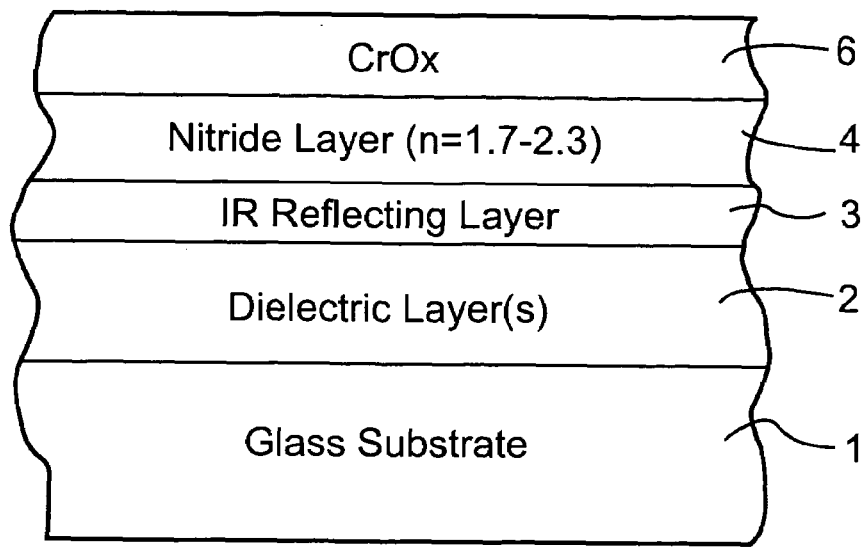
FIG. 3 is a partial cross sectional view of a monolithic coated article according to another example embodiment of this invention, which utilizes a dual layer overcoat of nitride/$CrO_X$, where the nitride is optional.

FIG. 3 illustrates a coated article according to another example embodiment of this invention. The FIG. 3 embodiment is similar to the FIG. 1 embodiment, except that the zirconium oxide layer has been replaced with a layer of or comprising chromium oxide 6. Nitride layer 4 is optional in this embodiment. Surprisingly, it has been found that the chromium oxide layer 6 provides mechanical and chemical durability (e.g., scratch resistance and resistance to corrosion from alkaline solutions and the like), in a manner similar to the zirconium oxide described above. In other words, coated articles of the FIG. 3 embodiment are much more resistant to corrosion from alkaline solutions due to the presence of the chromium oxide layer 6, than they otherwise would be. However, it has been found that the FIG. 3 embodiment, with the chromium oxide layer 6, is not particularly useful if heat treated because the chromium oxide tends to delaminate from silicon nitride in many instances if subjected to HT. Thus, the FIG. 3 embodiment is preferably not heat treated, and thus the nitride layer 4 is optional. Due to its absorption, the thickness of chromium oxide inclusive layer 6 is preferably from about 5–40 Å, more preferably from about 10–30 Å in certain example embodiments of this invention.

Figure 4:
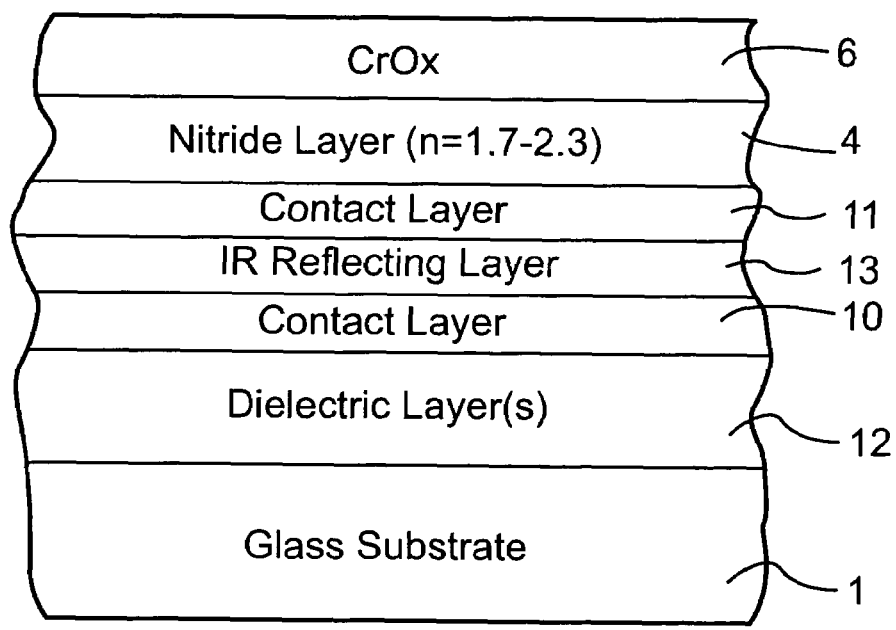
FIG. 4 is a partial cross sectional view of a monolithic coated article according to another example embodiment of this invention, which utilizes a dual layer overcoat of nitride/$CrO_X$, where the nitride is optional.

The FIG. 4 embodiment is a combination of the FIGS. 2 and 3 embodiments. The FIG. 4 embodiment is similar to the FIG. 2 embodiment except that the zirconium oxide layer has been replaced with a layer of or including chromium oxide 6. As explained above, it has been found that the chromium oxide layer 6 provides mechanical and chemical durability (e.g., scratch resistance and resistance to corrosion from alkaline solutions and the like), in a manner similar to the zirconium oxide. In other words, coated articles of the FIG. 4 embodiment are much more resistant to corrosion from alkaline solutions due to the presence of the chromium oxide layer 6, than they otherwise would be. However, it has been found that the FIG. 4 embodiment, with the chromium oxide layer 6, is not heat treatable in a commercially acceptable manner because the chromium oxide tends to delaminate in many instances. Thus, the FIG. 4 embodiment is preferably not heat treated, and thus the nitride layer 4 is optional.

Overcoat layers systems (e.g., dual layer overcoats 4, 5 of nitride/ZrO; or overcoats comprising chromium oxide 6) may be provided over a variety of different types of underlying solar control coatings. The coatings shown in FIGS. 1–4 under the overcoats 4, 5 and 6 are provided for purposes of example only, and are not intended to be limiting. For example, a dual layer overcoat 4, 5 (or an overcoat including chromium oxide layer 6 and/or layer 4) may be provided over any other type of suitable solar control coating in alternative embodiments of this invention, such as over a double-silver coating or the like. For purposes of example, and without limitation, zirconium oxide layer 5 (or an overcoat including chromium oxide layer 6) may be provided over the coatings of any of U.S. Pat. Nos. 5,837,108, 5,229,194, 5,557,462, 5,514,476, 6,495,263, 6,514,620, 6,475,626, or 6,524,714, or over any coating of any of U.S. Ser. Nos. 09/793,404, or 10/300,007, the disclosures of which are all hereby incorporated herein by reference.

Moreover, it is pointed out that other layer(s) may or may not be provided between silicon nitride layer 4 and zirconium oxide layer 5 (or the chromium oxide layer) in certain example embodiments of this invention. For example, a layer(s) comprising silicon oxynitride and/or silicon oxide may be provided between layers 4 and 5 in certain example embodiments of this invention.

Certain terms are prevalently used in the glass coating art, particularly when defining the properties and solar management characteristics of coated glass. Such terms are used herein in accordance with their well known meaning. For example, as used herein:

Intensity of reflected visible wavelength light, i.e. "reflectance" is defined by its percentage and is reported as $R_XY$ (i.e. the Y value cited below in ASTM E-308-85), wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides.

Color characteristics are measured and reported herein using the CIE LAB a*, b* coordinates and scale (i.e. the CIE a*b* diagram, Ill. CIE-C, 2 degree observer). Other similar coordinates may be equivalently used such as by the subscript "h" to signify the conventional use of the Hunter Lab Scale, or Ill. CIE-C, 10° observer, or the CIE LUV u*v* coordinates. These scales are defined herein according to ASTM D-2244-93 "Standard Test Method for Calculation of Color Differences From Instrumentally Measured Color Coordinates" Sep. 15, 1993 as augmented by ASTM E-308-85, Annual Book of ASTM Standards, Vol. 06.01 "Standard Method for Computing the Colors of Objects by 10 Using the CIE System" and/or as reported in IES LIGHTING HANDBOOK 1981 Reference Volume.

The terms "emittance" and "transmittance" are well understood in the art and are used herein according to their well known meaning. Thus, for example, the terms visible light transmittance (TY), infrared radiation transmittance, and ultraviolet radiation transmittance ($T_{UV}$) are known in the art. Total solar energy transmittance (TS) is then usually characterized as a weighted average of these values from 300 to 2500 nm (UV, visible and near IR). With respect to these transmittances, visible transmittance (TY), as reported herein, is characterized by the standard CIE Illuminant C, 2 degree observer, technique at 380–720 nm; near-infrared is 720–2500 nm; ultraviolet is 300–380 nm; and total solar is 300–2500 nm. For purposes of emittance, however, a particular infrared range (i.e. 2,500–40,000 nm) is employed.

Visible transmittance can be measured using known, conventional techniques. For example, by using a spectrophotometer, such as a Perkin Elmer Lambda 900 or Hitachi U4001, a spectral curve of transmission is obtained. Visible transmission is then calculated using the aforesaid ASTM 308/2244-93 methodology. A lesser number of wavelength points may be employed than prescribed, if desired. Another technique for measuring visible transmittance is to employ a spectrometer such as a commercially available Spectrograd spectrophotometer manufactured by Pacific Scientific Corporation. This device measures and reports visible transmittance directly. As reported and measured herein, visible transmittance (i.e. the Y value in the CIE tristimulus system, ASTM E-308-85) uses the Ill. C., 2 degree observer.

Another term employed herein is "sheet resistance". Sheet resistance ($R_S$) is a well known term in the art and is used herein in accordance with its well known meaning. It is here reported in ohms per square units. Generally speaking, this term refers to the resistance in ohms for any square of a layer system on a glass substrate to an electric current passed through the layer system. Sheet resistance is an indication of how well the layer or layer system is reflecting infrared energy, and is thus often used along with emittance as a measure of this characteristic. "Sheet resistance" may for example be conveniently measured by using a 4-point probe ohmmeter, such as a dispensable 4-point resistivity probe with a Magnetron Instruments Corp. head, Model M-800 produced by Signatone Corp. of Santa Clara, Calif.

The terms "heat treatment" and "heat treating" as used herein mean heating the article to a temperature sufficient to enabling thermal tempering, bending, and/or heat strengthening of the glass inclusive article. This definition includes, for example, heating a coated article to a temperature of at least about 580 or 600 degrees C. for a sufficient period to enable heat strengthening, bending, and/or tempering. In some instances, the HT may be for at least about 4 or 5 minutes.

Once given the above disclosure many other features, modifications and improvements will become apparent to the skilled artisan. Such other features, modifications and improvements are therefore considered to be a part of this invention, the scope of which is to be determined by the following claims:

What is claimed is:

1. A coated article including a layer system supported by a glass substrate, the layer system comprising:
   a first dielectric layer supported by the glass substrate;
   an infrared (IR) reflecting layer supported by the glass substrate and provided over at least the first dielectric layer; and
   a multi-layer overcoat wherein the multi-layer overcoat is an outermost coat of the layer system provided over at least the IR reflecting layer, wherein the overcoat includes a first layer comprising silicon nitride having an index of refraction "n" of from 1.7 to 2.5 and a second layer comprising zirconium oxide located over the first layer comprising silicon nitride, and wherein a layer comprising silicon oxynitride and/or silicon oxide is provided between the first layer comprising silicon nitride and the second layer comprising zirconium oxide.

2. The coated article of claim 1, wherein the first layer comprising silicon nitride has an index of refraction "n" of from 1.9 to 2.2.

3. The coated article of claim 1, wherein the coated article is heat treated and has a ΔE* value (glass side reflective) of less than or equal to 6.0 due to heat treatment.

4. The coated article of claim 1, wherein the coated article is heat treated and has a ΔE* value (glass side reflective) of less than or equal to 4.0 due to heat treatment.

5. The coated article of claim 1, wherein the coated article is heat treated and has a ΔE* value (glass side reflective and/or transmissive) of less than or equal to 3.0 due to heat treatment.

6. The coated article of claim 1, wherein the coated article is heat treated and has a ΔE* value (glass side reflective and/or transmissive) of less than or equal to 2.0 due to heat treatment.

7. The coated article of claim 1, wherein the first layer consists essentially of silicon nitride and the second layer consists essentially of zirconium oxide.

8. The coated article of claim 1, wherein the IR reflecting layer comprises at least one of Ni, Cr, NiCr, and Ag.

9. The coated article of claim 1, further comprising a contact layer located between the IR reflecting layer and the first dielectric layer.

10. The coated article of claim 1, wherein the coated article has a visible transmission of from 8–80%, and a glass side reflective a* value of from −6 to +6.

11. The coated article of claim 1, wherein the coated article comprises an IG window unit.

12. The coated article of claim 1, wherein the second layer comprising zirconium oxide is in direct contact with the first layer comprising silicon nitride.

13. The coated article of claim 1, wherein a major surface of the layer system of the coated article would show no visible damage if subjected to a ten minute NaOH boil test at about 195 degrees F. (0.4% NaOH mixed with water).

14. The coated article of claim 1, wherein the second layer comprising zirconium oxide is from 5–90 Å thick.

15. The coated article of claim 1, wherein the layer system has a sheet resistance ($R_S$) of less than 120 ohms/square.

16. A coated article including a layer system supported by a glass substrate, comprising:
   a first dielectric layer supported by the glass substrate;
   an infrared (IR) reflecting layer supported by the glass substrate and provided over at least the first dielectric layer;
   an overcoat provided over at least the IR reflecting layer and the first dielectric layer,
   wherein the overcoat comprises chromium oxide and is an outermost layer of the layer system; and
   wherein the coated article has a visible transmission of from 8 to 80%, and a sheet resistance ($R_S$) of less than 120 ohms/square.

17. The coated article of claim 16, wherein the chromium oxide layer consists essentially of chromium oxide.

18. The coated article of claim 16, wherein the IR reflecting layer comprises at least one of Ni, Cr, NiCr, and Ag.

19. The coated article of claim 16, further comprising a contact layer located between the IR reflecting layer and the first dielectric layer.

20. The coated article of claim 16, wherein a major surface of the layer system of the coated article would show no visible damage if subjected to a ten minute NaOH boil test at about 195 degrees F. (0.4% NaOH mixed with water).

21. The coated article of claim 16, wherein the first dielectric layer comprises a metal nitride or a metal oxide.

22. The coated article of claim 16, wherein the first dielectric layer comprises silicon nitride.

23. A coated article including a layer system supported by a glass substrate, the layer system comprising:
   a first dielectric layer supported by the glass substrate;
   an infrared (IR) reflecting layer supported by the glass substrate and provided over at least the first dielectric layer;
   an overcoat comprising a layer consisting essentially of chromium oxide provided over at least the IR reflecting layer, wherein the layer consisting essentially of chromium oxide is the outermost layer of the layer system; and
   wherein the coated article has a visible transmission of from 8 to 80%, and a sheet resistance ($R_S$) of less than 250 ohms/square.

24. The coated article of claim 23, wherein the IR reflecting layer comprises at least one of Ni, Cr, NiCr, and Ag.

25. A coated article including a layer system supported by a glass substrate, the layer system comprising:
   a first dielectric layer supported by the glass substrate;
   an infrared (IR) reflecting layer supported by the glass substrate and provided over at least the first dielectric layer;
   a multi-layer overcoat wherein the multi-layer overcoat is an outermost coat of the layer system provided over at least the IR reflecting layer, wherein the overcoat comprises layers comprising the following materials going away from the glass substrate: nitride/$ZrO_x$/nitride/$ZrO_x$.

26. The coated article of claim 25, wherein said nitride comprises silicon nitride.

27. The coated article of claim 25, wherein the overcoat comprises layers comprising the following materials going away from the glass substrate: nitride/$ZrO_x$/nitride/$ZrO_x$/nitride/$ZrO_x$.

28. The coated article of claim 25, wherein the coated article is heat treated and has a ΔE* value (glass side reflective) of less than or equal to 4.0 due to heat treatment.

29. The coated article of claim 25, wherein the IR reflecting layer comprises one or more of Ni, Cr, NiCr, and Ag.

30. The coated article of claim 25, wherein the coated article has a visible transmission of from 8–80%, and a glass side reflective a* value of from −6 to +6.

31. The coated article of claim 25, wherein a major surface of the layer system of the coated article would show no visible damage if subjected to a ten minute NaOH boil test at about 195 degrees F. (0.4% NaOH mixed with water).

* * * * *